Patented Nov. 24, 1925.

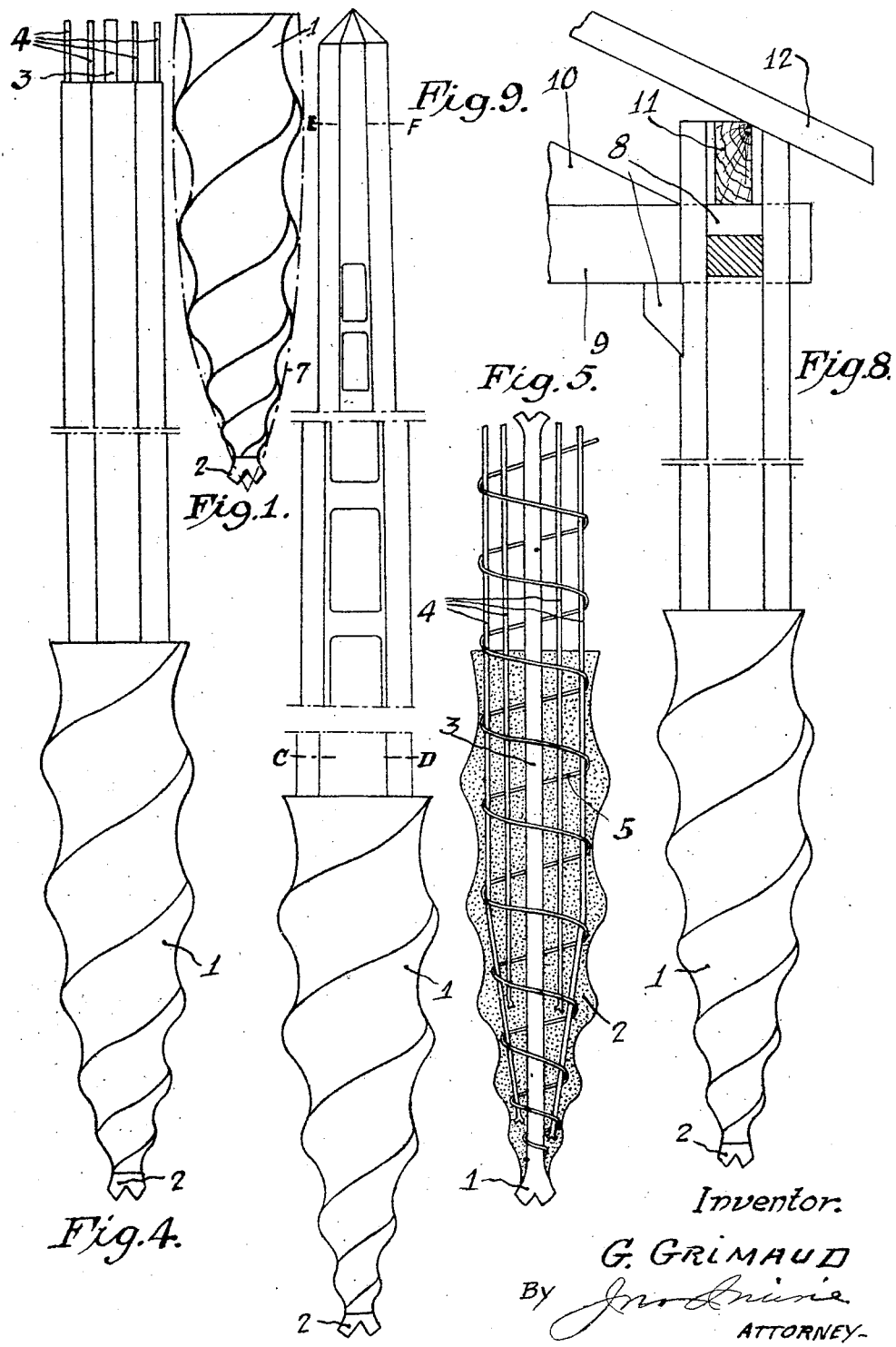

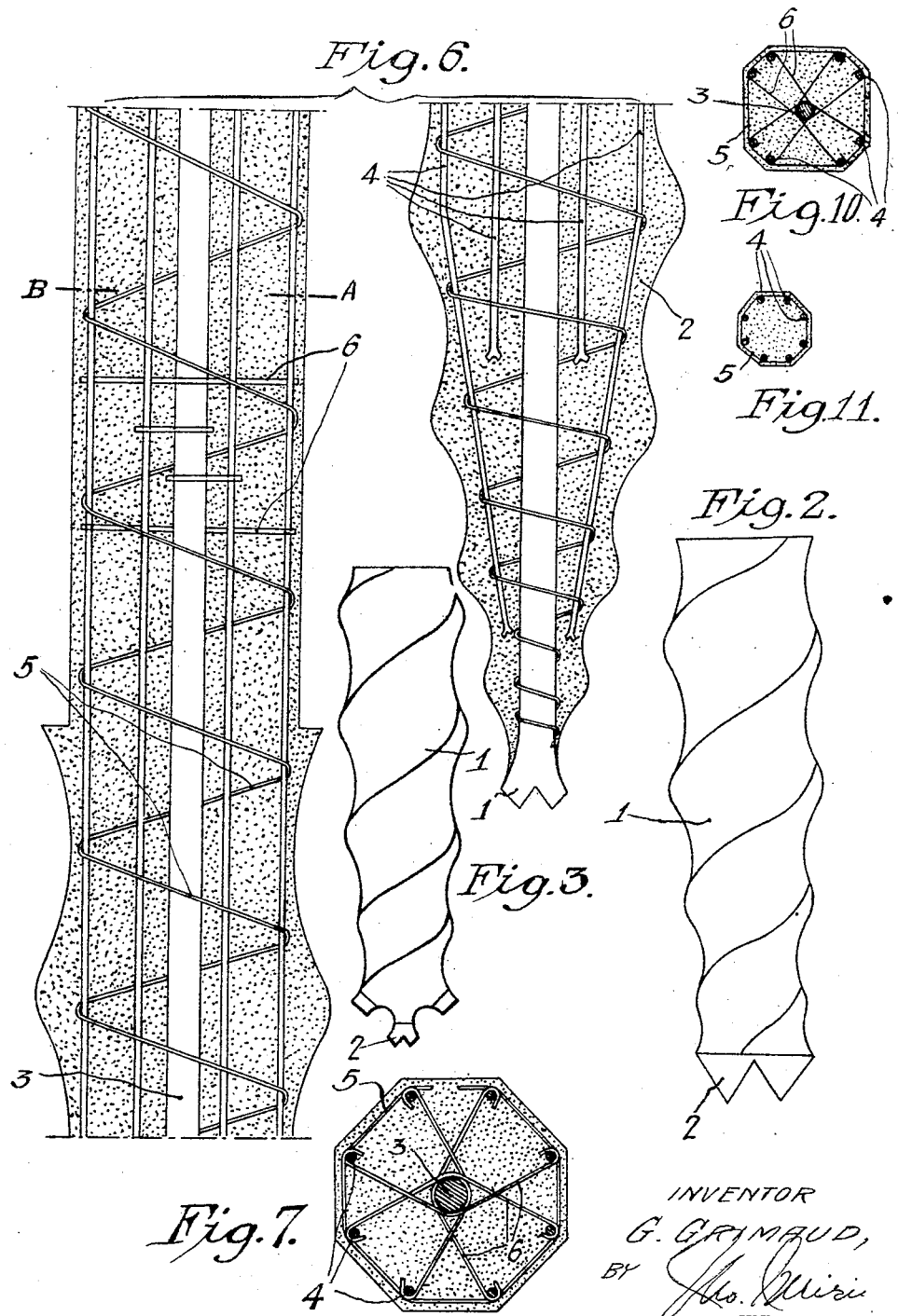

1,563,024

UNITED STATES PATENT OFFICE.

GUSTAVE GRIMAUD, OF BOUILLE COURDAULT PAR OULMES, FRANCE.

REENFORCED-CONCRETE STAKE.

Application filed February 1, 1924. Serial No. 690,062.

*To all whom it may concern:*

Be it known that GUSTAVE GRIMAUD, manufacturer, citizen of the Republic of France, residing at Bouille Courdault par Oulmes, Vendee, France, have invented certain new and useful Improvements in Reenforced-Concrete Stakes, of which the following is a specification.

The invention relates to reenforced concrete stakes and aims to provide a stake which may be sunk into the ground merely by rotation and thus replacing the cumbersome hammering appliances usually employed by a lever or other simple and portable means.

According to the main features of the invention the stake has a screw head whereby it may be caused by rotation to penetrate into the ground and further is provided with an axial reenforcing bar extending through said head and into the body portion of the stake the end of said bar being shaped to form a cutting point for the screw head. The reenforcement preferably comprises an axial bar, a plurality of longitudinal rods spaced around adjacent the periphery of the stake, spiral binding wire around said rods and a plurality of hook members connecting the axial bar and said rods.

Stakes constructed in accordance with the present invention are applicable to all kinds of foundations, supports, pillows and the like: they may be employed for piles as well as for columns.

The drawings show the invention applied in several forms.

Fig. 1 shows the screw head of a stake suitable for soft earth such as clay.

Figs. 2 and 3 show other screw heads of stakes suitable for harder soils.

Fig. 4 shows an assembled stake provided with a screw and suitable for the foundations of works of art such as bridges, stagings and the like.

Fig. 5 is a vertical section of the screw head of a stake showing the interior reenforcement.

Fig. 6 is a vertical section of a stake which is moulded simultaneously with the screw head.

Fig. 7 is a horizontal section on line A—B of Fig. 6 showing the special arrangement of reenforcement horizontally to resist the torsion due to screwing.

Fig. 8 shows a stake supporting a framework such as for a hangar, stables, magazine or the like.

Fig. 9 shows a telegraph post constructed in accordance with this invention.

Fig. 10 is a section on lines C—D of Fig. 9.

Fig. 11 is a section on line E—F of Fig. 9.

In general design the reenforced concrete stake has at one end a screw portion 1 of which the working point 2 is suitably shaped according to the kind of earth to be penetrated thereby and the reenforcement is such as to offer the greatest resistance to torsion when the stake is rotated to cause the screw to penetrate the ground.

The screw head 1 has a number of helixes or threads the inclination of which may vary according to the nature of the earth. Preferably a double thread is employed and terminates in a flat fish-tailed point, the extremities being slightly turned out. This point is furnished by the end of the axial reenforcement or core 3 (Figs. 5, 6 and 7) which is given the desired form after moulding.

The section of the stake may be a square, circular or other form, but is preferably octagonal and the reenforcement comprises eight bars 4 placed near the periphery (Figs. 5, 6 and 7), an axial bar 3, a spiral binding wire 5 and a number of radial hook members 6 (Figs. 6 and 7) spaced apart about 25 centimetres and rendering the whole homogeneous and offering efficient resistance to torsional or shearing forces called into play when the stake is screwed into the earth.

In the case of very soft earth or where little force will be required the central bar 3 may be dispensed with and the point 2 of the screw head 1 may be formed entirely of cement.

The process of making the stakes is practically the same as is usually employed for ordinary concrete stakes which are to be forced, rammed or otherwise submitted to blows. The screw portion 1 may be obtained in two ways; it may be formed first by itself (Fig. 5) the reenforcements passing beyond the screw a sufficient length to enable same to be solid with the stake when finished, or by a metal mould abutting against the bottom of the mould of the stake and of appropriate form when shut but having filling apertures so that it may be filled up without difficulty. Fig. 6 represents in horizontal section an example of this kind. The length of the screw is about four stake diameters and its form may generally be inscribed in an ogive 7 (Fig. 1). The form given to the shaft, the screw and the reenforcement may vary greatly, the principle always remaining the same, and axial bar 3 may be formed in any usual or well known way to afford additional hold upon the concrete. Stakes made according to this invention may advantageously be employed in all kinds of foundations for works of art when ordinary concrete or wooden stakes are actually employed. Moreover they have marked advantages in the construction of light works on poor ground, (small bridges, foundations for retaining walls and the like) they do not require special sinkage material and hand labour is greatly reduced. The type of stake indicated in Fig. 4 in which the bars project beyond the stake to be incorporated in the adjoining structure is especially adaptable to monolithic design.

Furthermore, the employment of the said stakes is advantageous in the construction of hangars or sheds for agricultural or industrial purposes, in such places where the cost of foundations would otherwise be prohibitive. With a number of stakes sunk in pairs and supporting cross girders, a hangar may be constructed in a few days. Fig. 8 shows one of these in elevation. The end post has at the upper end two mortises at right angles to one another, the lower to receive the tie beam and the upper to take the purlin. Level with the bottom of each mortise is placed a console of wood or iron for augmenting the support of each. In Fig. 8, 8 are the consoles, 9 the tie bar, 10 the principal rafter, 11 the purlin and 12 the rafter.

A further use for which these stakes are adapted is for carrying electric cable over boggy country, a suitable stake being shown in Figs. 9, 10 and 11. The stake is tapered and a number of apertures are formed therein for lightness and economy, the central bar does not pass beyond the lowermost of these and the appliance used to rotate the post may be inserted in the lowermost aperture.

It will be appreciated that I have provided a stake which may be set up in any desired place merely by rotation thereof until the point has firmly embedded itself in the ground, which is a great advantage over the method of heavy battering. When used for heavy work it will be necessary to employ staging or scaffolding to position the stake in the usual manner and to hold it in the desired vertical or inclined position whilst being rotated by levers, ratchet mechanism or the like.

Having now particularly described and ascertained the nature of my said invention and in what manner the same is to be performed, I declare that what I claim is:—

1. A concrete stake having a screw head, an axial reenforcing bar extending therethrough, a plurality of longitudinal bars arranged about the axial bar, spiral binding wires extending around said rod, and a plurality of hook members connecting the axial bar and said rods.

2. A concrete stake having a body of polygonal cross section and having a reenforcement including an axial bar, a plurality of longitudinal rods disposed adjacent the corners of the stake body, and hook members uniting said rods and axial bar.

3. A concrete stake having a body of polygonal cross section and having a reenforcement including an axial bar, a plurality of longitudinal rods disposed adjacent the corners of the stake body, hook members uniting said rods and axial bar, and an independent screw head adapted for connection with the body.

4. A concrete stake having a body of polygonal cross section and having a reenforcement including an axial bar, a plurality of longitudinal rods disposed adjacent the corners of the stake body, hook members uniting said rods and axial bar, and an independent screw head adapted for connection with the body, said body being formed with a plurality of apertures to receive an implement for turning the stake.

In testimony whereof I have affixed my signature.

GUSTAVE GRIMAUD. [L. S.]